Figure 1:
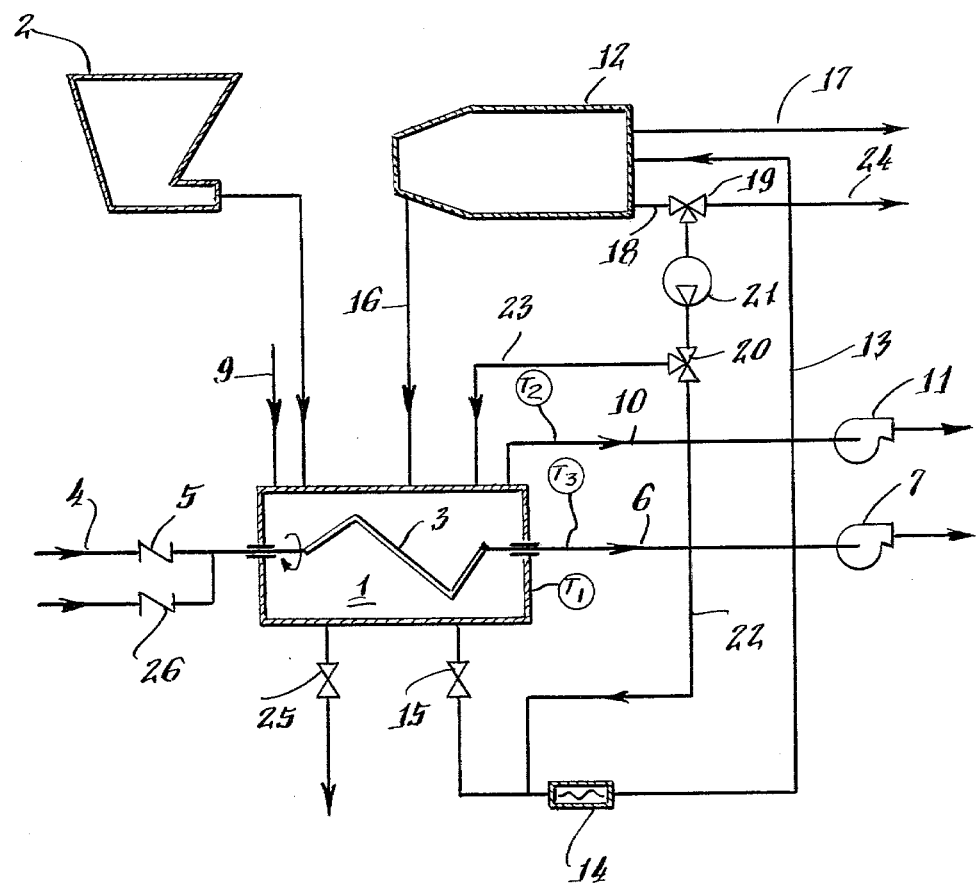

United States Patent

Bladh

[11] 4,335,146
[45] Jun. 15, 1982

[54] PROCESSING FISH RAW MATERIAL
[75] Inventor: Per V. H. Bladh, Jarna, Sweden
[73] Assignee: Alfa-Laval, Inc., Poughkeepsie, N.Y.
[21] Appl. No.: 230,702
[22] Filed: Feb. 2, 1981
[51] Int. Cl.³ .............................................. A01K 43/00
[52] U.S. Cl. ................... 426/231; 260/412.6; 426/472; 426/519; 426/417
[58] Field of Search ............... 426/479, 480, 417, 643, 426/456, 465, 472, 473, 511, 519, 520, 231; 260/412, 412.6

[56] References Cited
U.S. PATENT DOCUMENTS

| | | | |
|---|---|---|---|
| 2,877,122 | 3/1959 | Hiller | 426/465 |
| 3,959,518 | 5/1976 | Vincent | 426/643 |
| 4,137,335 | 1/1979 | Holm et al. | 426/472 |
| 4,216,239 | 8/1980 | Gloppestad | 426/472 |

Primary Examiner—Raymond N. Jones
Assistant Examiner—George C. Yeung
Attorney, Agent, or Firm—Cyrus S. Hapgood

[57] ABSTRACT

A heat exchanger equipped for indirect heating, stirring and steam removal is charged with a finely divided fish mass, whereafter a combined boiling and drying procedure is carried out in the heat exchanger with essentially continuous heat supply and steam removal until the heat exchanger contains fish meal with a desired low water content and oil content. The oil removal is effected during part of the period for said boiling and drying procedure by feeding fish mass from the heat exchanger to a decanter having three separate outlets for separated sludge phase, oil phase and water phase while continuously recirculating to the heat exchanger the sludge phase separated in the decanter, removing separated oil for storing or further treatment, and removing separated stick water, at least part of the stick water being recirculated to the heat exchanger and/or being remixed with the fish mass discharged from the heat exchanger to be fed into the decanter.

13 Claims, 3 Drawing Figures

PROCESSING FISH RAW MATERIAL

The present invention relates to a process for the recovery of fish meal and fish oil from fish, the process comprising boiling the raw fish, separating and removing oil from the boiled fish mass by means of a centrifugal separator of the kind having a rotating feed screw and three separate outlets for a sludge phase, an oil phase and a water phase (herein further called stick water phase), respectively, and drying the sludge phase to fish meal with a desired low water content and oil content.

Modern fish meal and fish oil industry is dominated by full continuous processes comprising several unit steps with special equipment for each step. Thus, a typical continuous fish processing plant might comprise a boiler, a coarse screen, one or usually several centrifuges or presses, a stick water evaporator unit and a drying unit. For transportation between the different steps, means such as pumps and screw conveyors are provided and often also one or several intermediate storage tanks. For economic reasons, such continuous plants are usually designed for production capacities in the range of 200–3000 tons/day of raw fish.

One object of the present invention is to provide a process for the production of fish meal and fish oil from fish, which process requires a relatively low capital investment and is suitable for considerably smaller production volumes than those required for economical performance of conventional continuous fish meal plants.

A further object of the invention is to provide a simple batch process for the production of fish meal and fish oil, which process is suitable for programmed control and does not require manual supervision during the major part of each batch.

These objects have been attained by a process characterized mainly in charging finely divided fish mass into a heat exchanger equipped for direct heating, stirring and steam removal, then carrying out a combined boiling and drying procedure in the heat exchanger during essentially continuous heat supply and steam removal until the heat exchanger contains fish meal with a desired low water content and oil content. The oil removal is carried out during a part of the period for said boiling and drying procedure by feeding said centrifuge directly or through a buffer space with fish means from the heat exchanger while continuously returning to the heat exchanger the sludge phase separated out in the centrifuge, discharging separated oil for storing or further treatment, and removing separated stick water. At least a part of the stick water is recirculated to the heat exchanger and/or is remixed with the fish mass discharged from the heat exchanger to be fed into the centrifuge.

According to the invention, all heating operations are carried out in one and the same heat exchanger, the heating capacity of which is utilized from the start of each batch until the fish meal is ready and the heat exchanger is discharged. Since the oil withdrawal is achieved by connecting the decanter centrifuge periodically during the period of operation of the heat exchanger, an almost continuous use of the heat exchanger capacity is possible.

Figure 2:
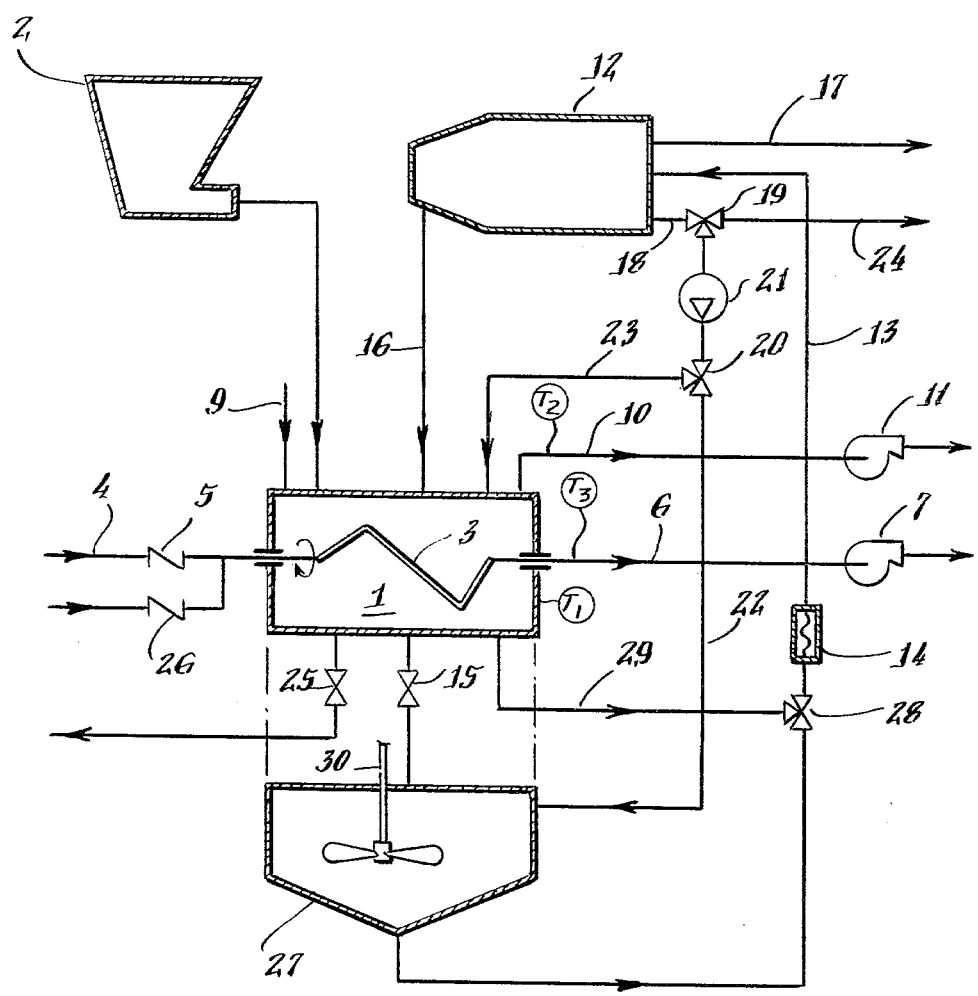
Figure 3:
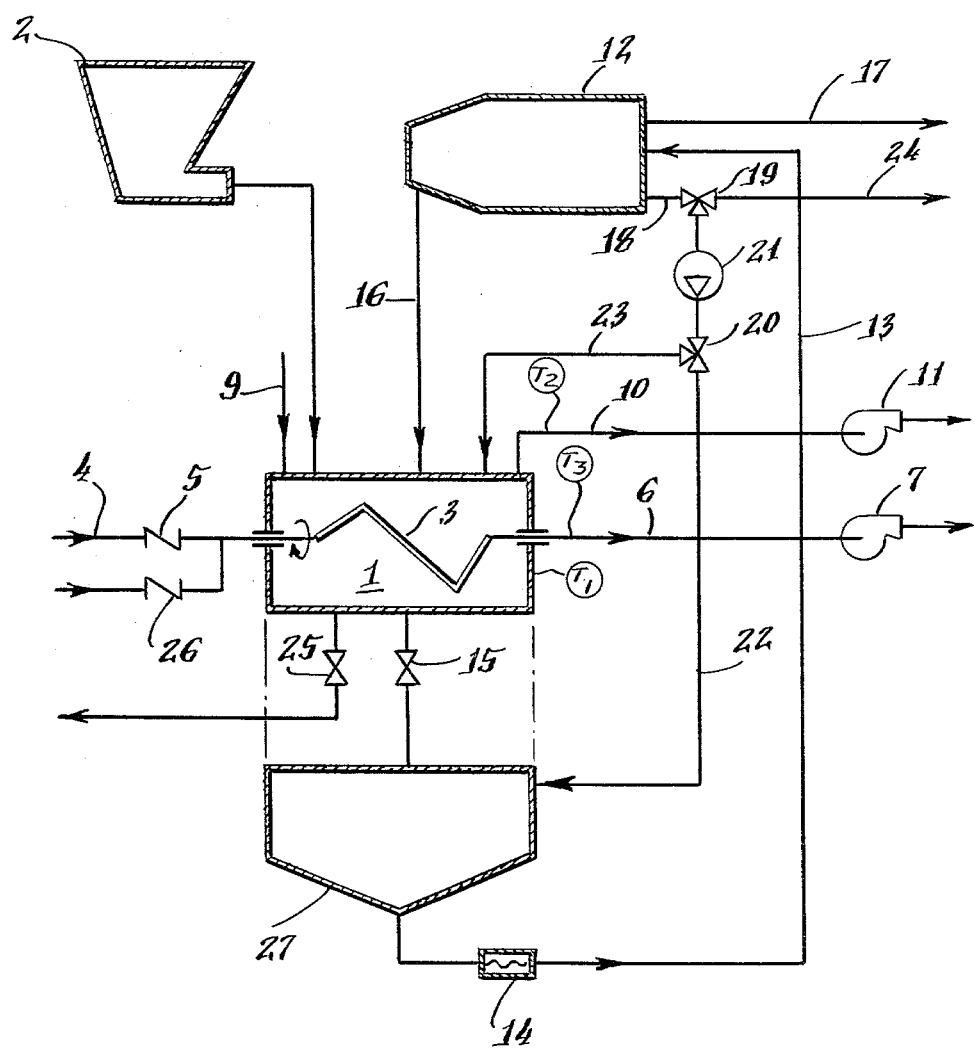

The invention will be further described with reference to three embodiments thereof shown as examples in the accompanying drawings, in which FIGS. 1–3 are flowcharts of the different embodiments.

In the embodiment shown in FIG. 1, the oil withdrawal is achieved by means of a three-phase decanter operating in direct loop with the heat exchanger which works as a combined boiler and dryer. In processing a batch of raw fish, a heat exchanger 1 is charged with raw fish which has been milled in a mill 2. The heat exchanger 1 is indirectly heated by means of a rotating tube bundle 3 connected to a heat source through line 4 and a suction valve 5 and to a suction line 6 with a suction fan 7. Any heating medium can be used. Available waste gases, such as diesel exhaust gases, are a cheap alternative. Steam or flue gases, such as diesel exhaust gases, are a cheap alternative. Steam or flue gases from a special flue gas unit are other possibilities. The heat exchanger is further provided with an air intake line 9 and an exhaust line 10 for forced venting by means of a fan 11.

When the fish bulk in the heat exchanger 1 has reached coagulation temperature, that is a temperature in the range of 60°–100° C., a three phase decanter 12 is started, the inlet 13 of which is connected to the heat exchanger 1 by means of a pump 14 and a discharge valve 15. The sludge outlet 16 of the decanter is connected to the heat exchanger 1 for recirculation of separated sludge. The oil phase is discharged from the decanter through line 17 for storing or further treatment, and separated stick water leaves through line 18. The stick water leaving the decanter can be recirculated in desired proportions through valves 19 and 20 by means of a pump 21, both through a line 22 to be remixed with fish mass fed to the decanter 12 and through line 23 to the heat exchanger 1 for evaporation, or the stick water can be discharged from the plant through line 24. To simply waste the stick water can be an appropriate solution, especially on board a ship from which the direct disposal into the sea might not cause any serious pollution problems.

In the heat exchanger 1, water is continuously withdrawn from the fish bulk during the separation period. Consequently, the dried content of the fish mass fed to the decanter successively increases. Since the lowest possible oil content in the fish meal is desired and the length of the operating period of the decanter does not increase the total batch time, the decanter loop is run as long as possible. By recirculating stick water through line 22 the fish mass from the heat exchanger can be diluted and the separation period prolonged. When the decanter loop is interrupted, the heat exchanger 1 continues to work as a dryer until the fish meal has reached the desired low water content. Then the heat exchanger is discharged through an appropriate outlet, here shown at 25, and a new batch can be started.

According to an advantageous embodiment of the invention, the batch sequence, from the moment when the heat exchanger is filled until the fish meal is ready to be discharged, is completely program-controlled. As an example of such a program control, when the heat exchanger has been filled with a certain amount of fish raw material and the raw material inlet has been connected to the sludge outlet 16 of the three phase decanter, the heat exchanger rotor 3 is started, the valve 5 is opened and the fan 7 starts to draw heating gases through the rotor tubes. When the fish bulk temperature according to a temperature transducer $T_1$ in the heat exchanger has reached about 85° C., the decanter 12 is started. When the temperature has increased further to about 95° C., the outlet valve 15 opens and the pump 14 starts.

The oil separation period can be time controlled or can be maintained until the oil flow leaving the decanter 12 falls below a predetermined rate. The decanter loop can also be interrupted by sensing the dry substance proportion in the heat exchanger 1. One example of this is the sensing of the rotor moment, which can be effected mechanically or by measuring the motor current or the phase shift of the same.

When the decanter loop is stopped, the heat exchanger continues to operate as a dryer. A temperature transducer $T_3$ in the line 6 for spent heating gases is used to avoid overheating and incrusting the heat exchanger. Before the discharging heating gases reach too high a temperature, the heat supply is reduced or cut off. Air at room temperature might also be supplied through the valve 26 to cool the rotor tubes. The program is interrupted after a certain time or at a signal from a transducer sensing the water content of the fish meal. This transducer can be the same as said transducer $T_3$ in the heating gas discharge line 6. Other possibilities are a temperature transducer $T_2$ or a moisture content transducer in the vent line 10, since towards the end of a batch less and less steam is discharged and the temperature of the discharged vent air rises.

The desired distribution of the stick water leaving the decanter 12 can be achieved by preset valves. Also, an active control of the stick water valves can be part of the control program.

In the embodiment of FIG. 2, a buffer space 27 is provided between the heat exchanger 1 and the decanter inlet 13. Those details having the same function as before have been given the same reference numerals.

By means of the buffer space 27, which may be a tank located directly below the heat exchanger and heat insulated against the surroundings, a continued deoiling is possible after the fish bulk in the heat exchanger has reached a viscosity that is critical for the decanter loop.

The decanter feed pump 14 in FIG. 2 is connected by a three-way valve 28 directly to the heat exchanger 1 through line 29 as well as to the buffer tank 27.

In the operation of the FIG. 2 embodiment, when a predetermined temperature has been reached in the heat exchanger 1, a first oil separation period is started by feeding the decanter 12 directly from the heat exchanger 1 through line 29. The deoiling is then maintained as described above for the embodiment according to FIG. 1, the decanter sludge being continuously fed through line 16 to the heat exchanger 1 and oil being discharged to the storage tank. During this period, at least a part of the separated stick water is preferably recirculated and collected in the buffer tank 27.

After a predetermined time or at a signal from another control function built in, the connection between the pump 14 and the heat exchanger 1 is closed, while the valve 15 is opened and the content of the heat exchanger is dropped down and mixed with the stick water in the tank 27. A stirrer 30 provided efficient mixing. Then a second deoiling period starts and lasts until the content of the tank 27 has been fed to the decanter 12. After the decanter has been stopped, the drying operation continues in the heat exchanger 1 until the meal has reached the desired water content.

By this way of operation, the decanter operating time is prolonged. However, the total process time is not prolonged, since the water removal capacity of the heat exchanger 1 is utilized during the whole batch sequence. After the first oil separation period, the fish mass has been freed of the major part of its oil content, and is once again (possibly after dilution with earlier separated stick water) passed through the decanter. Thus, the oil content of the fish meal produced can be further reduced in this embodiment.

The FIG. 3 embodiment can be regarded as a special case of the embodiment according to FIG. 2. Details having the same function as earlier have the same reference numerals.

In the FIG. 3 embodiment, the whole content of the heat exchanger 1 is dropped into the buffer tank 27 as soon as the fish bulk has reached a temperature suitable for the decanter loop. The decanter 12 is fed with fish mass by means of the pump 14 until the tank 27 is empty and the heat exchanger functions as a dryer during the remaining part of the program. The program-controlled part of the batch can be as follows:

When a certain temperature (for example 80° C.) is sensed at $T_1$, the decanter 12 starts. At a somewhat higher temperature (for example 90° C.), the outlet valve 15 opens and the whole content of heat exchanger 1 is dropped into the tank 27. The supply of heating gases is reduced or interrupted. The pump 14 starts, and sludge is fed from the decanter 12 to the heat exchanger 1 while oil is discharged through the oil outlet 17 to a storage tank, and stick water is recirculated in desired proportions through line 22 to the tank 27 and the heat exchanger 1 or discharged through the line 24.

The heat supply is then increased again, the venting fan 11 is started and the heat exchanger operates as a dryer during the remaining separation period. At the end of the same, the amount of recirculated stick water to the tank 27 may be increased in order to rinse the tank and to prevent dry operation of the pump 14. The pump 14 and the decanter 12 are stopped after a certain time. The heat exchanger 1 continues to operate for a certain additional period or until a certain temperature is reached at $T_2$ or $T_3$ when the heat supply to the heat exchanger 1 is interrupted. The discharge of the fish meal from the heat exchanger is then carried out during manual supervision.

I claim:

1. In a process for the recovery of meal and oil from raw fish, the steps comprise boiling a mass of the raw fish, separating and removing oil from the boiled fish mass by centrifuging in a centrifugal separator having a rotating feed screw and three separate outlets for a sludge phase, a heavier liquid phase and a lighter liquid phase, respectively, and then drying the sludge phase to fish meal, wherein the improvement comprises charging finely divided raw fish mass into a heat exchanger equipped for indirect heating, stirring and steam removal, then effecting a combined boiling and drying procedure in the heat exchanger while substantially continuously supplying heat thereto and removing steam therefrom until the heat exchanger contains fish meal with a desired low water content and oil content, removing oil during part of the period for said boiling and drying procedure by feeding said centrifugal separator with fish mass from the heat exchanger while continuously returning to the heat exchanger a sludge mass separated in said separator and while discharging separated oil from said separator and removing separated stick water from said separator and recirculating, at least part of the stick water to at least one of said heat exchanger and the fish mass removed from the heat exchanger for feeding into the separator.

2. The process of claim 1, in which said feeding of the centrifugal separator with fish mass is effected directly from the heat exchanger.

3. The process of claim 1, in which said feeding of the centrifugal separator with fish mass is effected through a buffer tank.

4. A process according to claim 1, in which the fish mass is fed directly to the separator for oil removal, the process comprising continuously heating and stirring the fish mass in the heat exchanger from the start of the batch until the heat exchanger contains finished fish meal, and starting and stopping the discharge of fish mass from the heat exchanger to the separator at empirically determined points of time with respect to the start of heating.

5. A process according to claim 1, in which the fish mass is fed directly to the separator for oil removal, the process comprising continuously heating and stirring the fish mass in the heat exchanger from the start of the batch until the heat exchanger contains finished fish meal, and starting and stopping the discharge of fish mass from the heat exchanger to the separator upon obtaining predetermined temperature and moisture conditions.

6. A process according to claim 4, in which the discharge of fish mass from the heat exchanger to the separator is started when a predetermined temperature is reached in the heat exchanger.

7. A process according to claim 4, in which the discharge of fish mass from the heat exchanger to the separator is interrupted when the oil flow leaving the separator falls below a predetermined value.

8. A process according to claim 1, in which the fish mass from the heat exchanger in a first oil removal period is fed directly to the separator while recirculating from the separator and collecting in a buffer tank at least a part of said separated stick water, whereafter a second oil removing period is initiated by transferring the fish mass from the heat exchanger to the buffer tank, mixing the fish mass with the stick water collected in the buffer tank, and feeding the resulting mixture to the separator.

9. A process according to claim 1, in which the fish mass in the heat exchanger is transferred to a buffer tank before the oil removal is started, whereafter the separator is fed with fish mass from the buffer tank until the same is essentially emptied of the fish mass.

10. A process according to claim 9, in which the transfer of fish mass from the heat exchanger to the buffer tank is initiated at a predetermined time after the heating of the heat exchanger is started.

11. A process according to claim 9, in which the transfer of fish mass from the heat exchanger to the buffer tank is initiated when a predetermined temperature has been reached in the heat exchanger.

12. A process according to claim 1, in which the supply of heating medium to the heat exchanger is at least substantially interrupted when a predetermined temperature has been reached in the heating medium discharged from the heat exchanger.

13. A process according to claim 1, in which the heat supply to the heat exchanger is at least substantially interrupted when a predetermined temperature has been reached in a venting air stream leaving the heat exchanger after having passed through the same in direct contact with the fish mass.

* * * * *